US008000350B2

(12) United States Patent
Riedel et al.

(10) Patent No.: US 8,000,350 B2
(45) Date of Patent: Aug. 16, 2011

(54) REDUCING BANDWIDTH OF A DATA STREAM TRANSMITTED VIA A DIGITAL MULTIMEDIA LINK WITHOUT LOSING DATA

(75) Inventors: Michael Riedel, Buchbach (DE); Roland Neumann, Bad Toelz (DE)

(73) Assignee: INOVA Semiconductors GmbH, Munich (DE)

( * ) Notice: Subject to any disclaimer, the term of this patent is extended or adjusted under 35 U.S.C. 154(b) by 1026 days.

(21) Appl. No.: 11/386,542

(22) Filed: Mar. 22, 2006

(65) Prior Publication Data

US 2006/0179201 A1 Aug. 10, 2006

Related U.S. Application Data

(63) Continuation of application No. PCT/EP2003/010523, filed on Sep. 22, 2003, and a continuation of application No. PCT/EP2003/010522, filed on Sep. 22, 2003.

(51) Int. Cl.
*H04J 3/06* (2006.01)
(52) U.S. Cl. .................................................... 370/503
(58) Field of Classification Search .......... 370/535–537, 370/542, 503; 725/17, 20; 348/194, 384.1, 348/435.1, 477–479; 386/245
See application file for complete search history.

(56) References Cited

U.S. PATENT DOCUMENTS

| 5,329,288 A * | 7/1994 | Kim ................................ 345/63 |
| 5,410,600 A | 4/1995 | Toy ................................ 380/268 |
| 5,940,610 A * | 8/1999 | Baker et al. ................... 713/600 |
| 6,151,334 A | 11/2000 | Kim et al. ..................... 370/468 |
| 6,530,085 B1 * | 3/2003 | Perlman ........................ 725/82 |
| 6,564,269 B1 | 5/2003 | Martin ........................... 710/20 |
| 6,954,491 B1 * | 10/2005 | Kim et al. ..................... 375/220 |

FOREIGN PATENT DOCUMENTS

| EP | 0781054 A2 | 12/1995 |
| EP | 1231795 A2 | 1/2002 |
| GB | 2262405 A | 9/1991 |
| WO | WO 97/13348 A | 10/1995 |
| WO | WO2005/029740 | 9/2003 |
| WO | WO2005/029857 | 9/2003 |
| WO | WO2005/029869 | 9/2003 |

OTHER PUBLICATIONS

STMicroelectronics, "FC106 Fibre Channel Transceiver 1.0625 GBaud," Sep. 1998, Rev. 1.2, 32 pages (document XP-002234618).

* cited by examiner

*Primary Examiner* — Derrick Ferris
*Assistant Examiner* — Omar Ghowrwal
(74) *Attorney, Agent, or Firm* — Imperium Patent Works; Darien K. Wallace

(57) ABSTRACT

A system for reducing the bandwidth of a data stream transmitted via a digital multimedia link does not result in the loss of data. The system encodes control signals such that control words are generated each time the status of the control signals change. The system multiplexes payload data and the control words to generate the data stream. If no blanking period of the payload data is present, the data stream comprises payload data. During the blanking period, the data stream comprises the control words. The data stream is transmitted across the digital multimedia link using transmit and receive FIFO memories. The transmitted data stream is then demultiplexed, and the payload data and the control words are separated from each other. The control words are decoded to recover the control signals. The system can transmit payload data conforming to the video formats VGA, SVGA, XGA, SXGA and UXGA.

17 Claims, 8 Drawing Sheets

| X pixel | Y pixel | V Freq. Hz | Color Bit | H Freq. kHz | Pixel Clock MHz | H Total pixel | H Visible pixel | V Total line | V Visible line | BW total GBit/s | BW woHBnk GBit/s | |
|---|---|---|---|---|---|---|---|---|---|---|---|---|
| 640 | 480 | 60 | 18 | 29,82 | 23,86 | 800 | 651 | 497 | 480 | 0,429 | 0,349 | VGA |
| 640 | 480 | 60 | 24 | 29,82 | 23,86 | 800 | 648 | 497 | 480 | 0,573 | 0,464 | |
| 800 | 600 | 60 | 18 | 37,32 | 38,22 | 1024 | 811 | 622 | 600 | 0,688 | 0,545 | SVGA |
| 800 | 600 | 60 | 24 | 37,32 | 38,22 | 1024 | 808 | 622 | 600 | 0,917 | 0,724 | |
| 1024 | 768 | 60 | 18 | 47,7 | 64,11 | 1344 | 1035 | 795 | 768 | 1,154 | 0,889 | XGA |
| 1024 | 768 | 60 | 24 | 47,7 | 64,11 | 1344 | 1032 | 795 | 768 | 1,539 | 1,181 | |
| 1280 | 1024 | 60 | 18 | 63,6 | 108,9 | 1712 | 1291 | 1060 | 1024 | 1,960 | 1,478 | SXGA |
| 1280 | 1024 | 60 | 24 | 63,6 | 108,9 | 1712 | 1288 | 1060 | 1024 | 2,613 | 1,966 | |
| 1600 | 1200 | 60 | 18 | 74,52 | 161 | 2160 | 1611 | 1242 | 1200 | 2,897 | 2,161 | UXGA |
| 1600 | 1200 | 60 | 24 | 74,52 | 161 | 2160 | 168 | 1242 | 1200 | 3,863 | 2,876 | |

FIG. 2

REDUCING BANDWIDTH OF A DATA STREAM TRANSMITTED VIA A DIGITAL MULTIMEDIA LINK WITHOUT LOSING DATA

CROSS REFERENCE TO RELATED APPLICATION

This application is filed under 35 U.S.C. §111(a) and is based on and hereby claims priority under 35 U.S.C. §120 and §365(c) from International Application Nos. PCT/EP2003/010523 and PCT/EP2003/010522, both filed on Sep. 22, 2003. Applications PCT/EP2003/010523 and PCT/EP2003/010522 were published on Mar. 31, 2005, as WO2005/029857 and WO2005/029869, respectively. This application is a continuation of International Application No. PCT/EP2003/010523. International Application No. PCT/EP2003/010523 was pending as of the filing date of this application, and the United States was an elected state in International Application No. PCT/EP2003/010523. The disclosures of International Application No. PCT/EP2003/010523 and International Application No. PCT/EP2003/010522 are incorporated herein by reference.

TECHNICAL FIELD

The present invention relates generally to a bidirectional digital multimedia link, and more specifically to reducing the bandwidth of a data stream transmitted across the link without losing data.

BACKGROUND

Digital satellite systems, DVD players, digital cameras and high definition televisions, as well as PC graphics, games and the Internet, offer a huge amount of digital video and audio data. In order for the digital infrastructure to process this multimedia data effectively, however, the data should be transmitted and displayed digitally without any loss from analog transmission and display technologies.

One method of transmitting multimedia uses the IEEE standard 1394, which is commonly known as Firewire or i-Link. This method provides for a high transmission speed of presently 400 Mbps and up to 3200 Mbps in the future. It is presently necessary, however, to perform a cyclic redundancy check (CRC) or a similar check in order to detect and correct bit errors occurring during transmission. Moreover, for a transmission speed of about 400 Mbps, the maximum length that data can be transmitted over a twisted pair cable using this method is about 4.5 meters, and the maximum length that data can be transmitted over a multimode optical fiber using this method is about 100 meters. In addition, the Firewire technology uses a high level protocol to communicate between the transmitter side and the receiver side.

Another method of transmitting multimedia data such as audio and video data is a method that uses the MPEG format to achieve data compression in order to minimize the required bandwidth. This method, however, is not lossless, and information contained in the original data before it is compressed is lost and cannot be recovered on the receiver side.

While it is important for certain applications that every detail of the transmitted data be recoverable at the receiver side, it is also important to reduce the bandwidth of the transmitted data in order to save bandwidth of the transmission channel.

A system is sought that can transmit multimedia data with reduced bandwidth, but yet that does not lose data in data compression processes prior to transmission.

SUMMARY

A system allows for the lossless reduction of bandwidth of a data stream transmitted via a digital multimedia link. The system for lossless reduction of bandwidth includes an encoder, a multiplexer, a transmission system, a demultiplexer and a decoder. The encoder encodes a control signal such that a control word is generated each time the control signal changes.

The multiplexer multiplexes payload data and a control word and outputs a data stream comprising the payload data if no blanking period of the payload data is present. The multiplexer outputs the control word if the blanking period of the payload data is present. The transmission system then transmits the data stream. Instead of transmitting the control signal, a control word is transmitted each time the control signal changes. The demultiplexer then receives the data stream transmitted by the transmitter and demultiplexes the payload data and the control word from the data stream such that the payload data and the control word are separated from each other. The decoder decodes a control word such that the control signal is recovered.

In one embodiment, the transmission system comprises a transmit FIFO and a receive FIFO. The data stream is input into the transmit FIFO before being transmitted, and the transmitted data stream is input into the receive FIFO before being input to the demultiplexer.

In another embodiment, the payload data and the control signal are synchronized to a system clock of an payload data input interface.

In yet another embodiment, the payload data is pixel data or audio data. The encoder is a run-length encoder, and the decoder is a run-length decoder.

A method allows for the lossless reduction of bandwidth of a data stream transmitted via a digital multimedia link. A control signal is encoded such that a control word is generated each time the control signal changes. Payload data and the control word are then multiplexed such that a data stream is output that comprises payload data if no blanking period of the payload data is present. The data stream comprises the control word if the blanking period of the payload data is present. The data stream is then transmitted. The payload data and the control word are demultiplexed from the data stream such that the payload data and the control word are separated from each other. The control word is then decoded such that the control signal is recovered.

In another embodiment, the data stream is FIFO processed before being transmitted, and the transmitted data stream is FIFO processed before being demultiplexed.

In yet another embodiment, the payload data and the control signal are synchronized to a system clock of a payload data input interface.

In yet another embodiment, the payload data is pixel data or audio data, and the run-length coding and run-length decoding are performed.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a table of listing the bandwidth and other characteristics of various video formats.

DETAILED DESCRIPTION

Reference will now be made in detail to some embodiments of the invention, examples of which are illustrated in the accompanying drawings.

Figure 1:
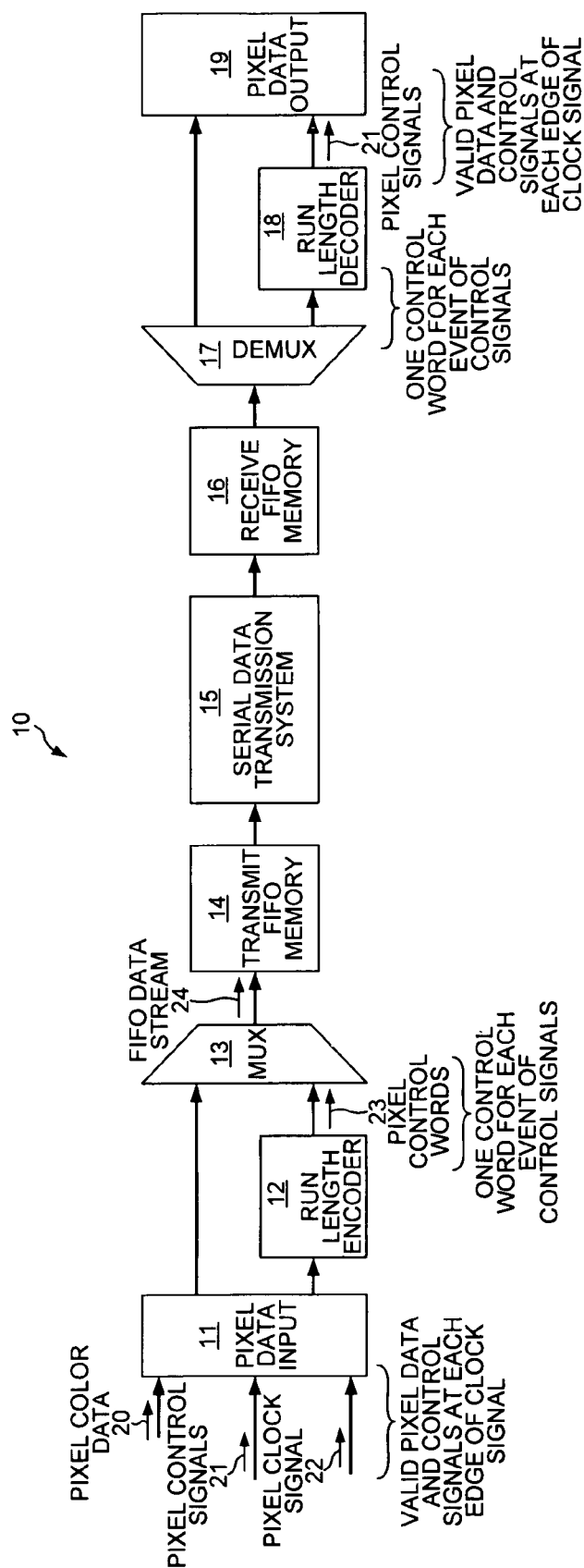
FIG. 1 is a schematic block diagram of a system that reduces bandwidth of a pixel data stream without losing data according to an embodiment of the present invention.

FIG. 1 shows a system 10 for reducing the bandwidth of a pixel data stream without losing data according to an embodiment of the present invention. System 10 replaces pixel control signals with control words that indicate a change of status of the control signals and suppress any pixel color data during a blanking period. The resulting pixel data stream now comprises pixel color data during a period of no blanking followed by a sequence of a few control words when the blanking period occurs. For VESA pixel formats, this saves approximately 20% of the required bandwidth for the native pixel stream.

System 10 includes a pixel data input interface 11, a run-length encoder 12, a multiplexer 13, a transmit FIFO (first-in first-out) memory 14, a serial data transmission system 15, a receive FIFO memory 16, demultiplexer 17, a run-length decoder 18, and a pixel data output interface 19.

System 10 can be used to transmit data over a bidirectional multimedia link, as described in international patent application serial number PCT/EP2003/010522 entitled "System and Method for Forming a Bidirectional Multimedia Link", for which the United States is a designated state. Although system 10 can be used with other data links, the bidirectional multimedia link of the aforementioned international patent application is described here as an exemplary use of system 10.

The aforementioned bidirectional multimedia link is a reliable, long-distance, serial bundle of links that can transmit Gigabits of data per second. The bandwidth of the bidirectional multimedia link can be increased by adding additional links or decreased by reducing the number of links. The bandwidth allocated to different types of multimedia data, such as audio, video and sideband data, can be changed by changing the bandwidth of the specific link of the bundle allocated to such data. The bidirectional multimedia link supports video formats ranging from VGA with 18-bit color depth to SXGA with 24-bit color depth and even to UXGA with 18-bit color depth.

A pixel stream as it is output from a graphic controller or the like or as it is input at a LCD display or the like comprises a predetermined number (n) of bits for pixel color data and up to three pixel control signals. The pixel control signals are used for horizontal and vertical synchronization. Pixel color data bits and pixel control signals are valid at each pixel clock edge. When the pixel control signals indicate a so-called blanking period, the pixel color data bits carry no meaningful information.

The bandwidth of such a pixel stream is a product of the pixel clock frequency and a sum of the pixel color data bits and the pixel control signals.

FIG. 2 lists the required bandwidth and other characteristics of various video formats, including VGA, SVGA, XGA, SXGA and UXGA.

The bidirectional multimedia link provides up to two serial links and a net link bandwidth slightly above 1 GBit/s per serial link. The bandwidth characteristics listed in FIG. 2 show that the SXGA and UXGA formats require a bandwidth that exceeds the net link bandwidth available even with a two-link setup.

Any bandwidth reduction should ensure that the compression algorithm does not change the pixel data because the pixel data might be automatically processed by an image processing system after transmission.

Pixel data input interface 11 is coupled both to run-length encoder 12 and to one data input lead of multiplexer 13. The output of run-length encoder 12 is coupled to another data input lead of multiplexer 13. The output of multiplexer 13 is coupled to an input of transmit FIFO memory 14. An output of transmit FIFO memory 14 is coupled to an input of serial data transmission system 15. An output of serial data transmission system 15 is coupled to an input of the receive FIFO memory 16. An output of receive FIFO memory 16 is coupled to an input of demultiplexer 17. One data output lead of demultiplexer 17 is directly coupled to pixel data output interface 19, and another data output lead of demultiplexer 17 is coupled to an input of run-length decoder 18. An output of run-length decoder 18 is also coupled to pixel data output interface 19.

Pixel color data 20 and pixel control signals 21 are provided synchronously to a pixel clock signal 22 at pixel data input interface 11. Run-length encoder 12 generates pixel control words 23 each time one of the pixel control signals 21 changes. Multiplexer 13 merges pixel color data 20 provided directly from pixel data input interface 11 and pixel control words 23 generated by run-length encoder 12. The resulting serial FIFO data stream 24 exhibits a variable bandwidth, with maximum bandwidth when pixel color data 20 is transmitted and a bandwidth close to zero when pixel control words 23 are transmitted. To leverage the bandwidth for a constant serial data transmission, transmit FIFO memory 14 is used.

Figure 3:
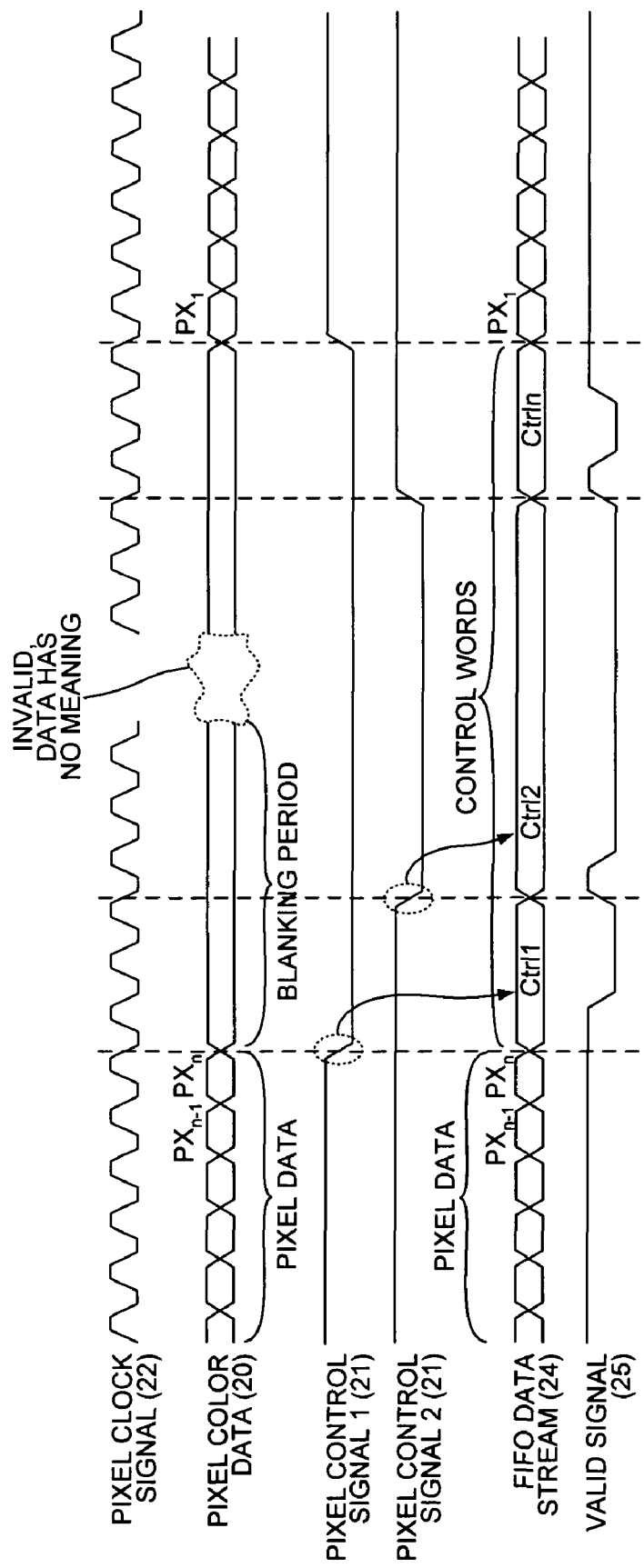
FIG. 3 is a waveform diagram of various signals used in the system according to the system of FIG. 1.

FIG. 3 is a waveform diagram that illustrates the operation of system 10. FIG. 3 shows that FIFO data stream 24 consists of pixel data (e.g., $PX_{n-1}$ and $PX_n$) from pixel color data 20 before a blanking period, and pixel control words 23 (e.g., Ctrl1, Ctrl2 and Ctrln) during the blanking period. A valid signal 25 is also shown.

Figure 4:
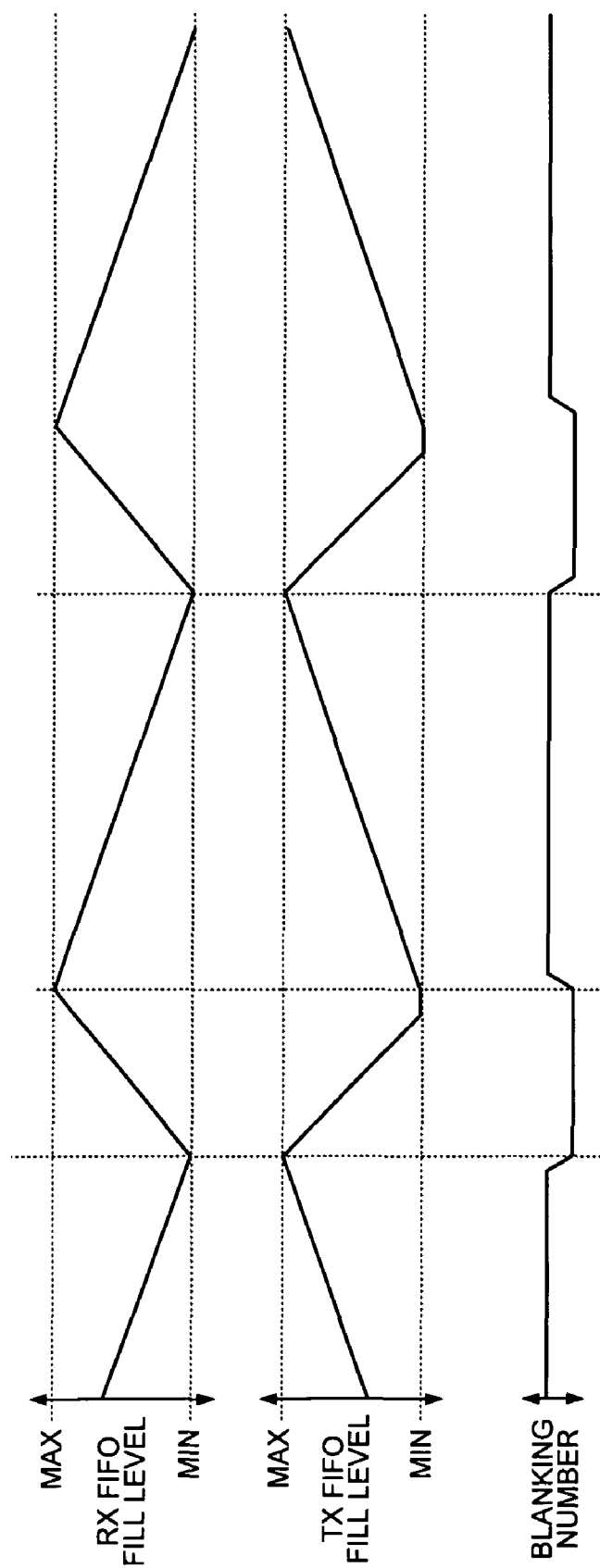
FIG. 4 is a time chart of fill levels of the transmit and receive FIFO memories used in the system of FIG. 1.

FIG. 4 is a time chart of fill levels of the transmit and receive FIFO memories used in the system of FIG. 1. FIG. 4 shows that receive FIFO memory 16 stores a certain offset level of pixel color data 20 and pixel control words 23. After demultiplexing by demultiplexer 17, pixel color data 20 is forwarded directly to pixel data output interface 19. The pixel control words 23, however, are decoded within run-length decoder 18. Run-length decoder 18 drives the pixel control signals 21 based on the pixel control words 23 generated at the transmitter side by run-length encoder 12. The pixel control signals 21 generated by run-length encoder 12 are then forwarded to pixel data output interface 19.

Changes of pixel control signals 21 do not occur very often. For example, there may be four changes of the pixel control signals 21 during two hundred intervals of pixel clock signal 22. Due to the fact that changes of pixel control signals 21 do not occur very often, few pixel control words 23 are transmitted. A different pixel control word is generated and transmitted only when the pixel control signals 21 change. Most importantly, instead of transmitting pixel control signals 21, only a pixel control word is transmitted each time the pixel control signals 21 change. For example, where the pixel control signals 21 change four times during two hundred intervals of pixel clock signal 22, only four pixel control words 23 would be transmitted. Effective lossless reduction of bandwidth is thereby achieved.

An embodiment of the present invention has been described above with respect to pixel color data and pixel control signals. It is also possible, however, to apply the present invention to any type of data having payload data and control signals in a manner similar to pixel data. Control words are transmitted instead of the control signals, and then only when the control signals change their status. The present invention can be applied to different multimedia data, such as audio data and video data. Furthermore, although an embodiment has been described using a serial data transmission system, the present invention is also applicable to other data transmission types. For example, system 10 can be applied to parallel data transmission systems because the manner of bandwidth reduction is independent of the data transmission type.

The serial bidirectional multimedia link with which system 10 can be used is now described in more detail.

Figure 5:
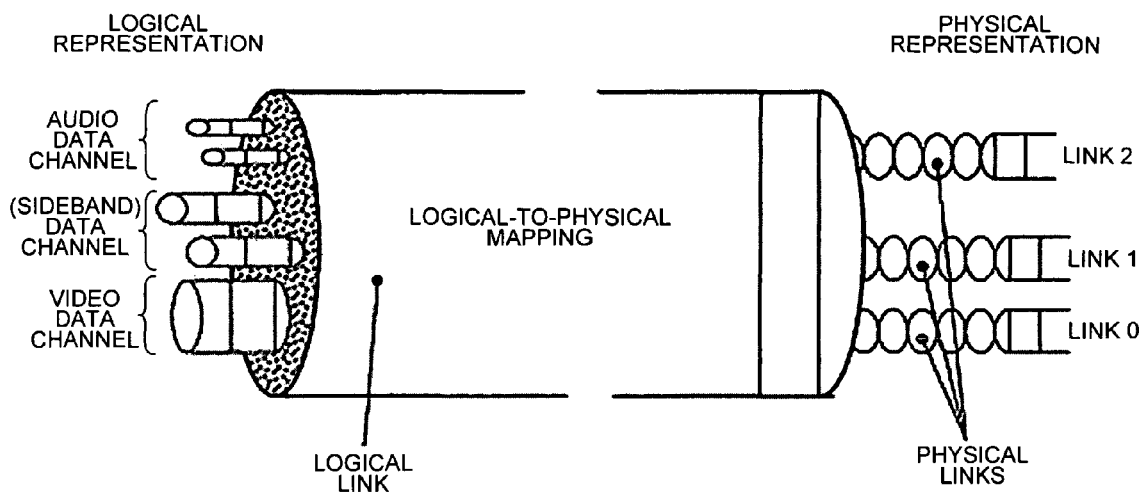
FIG. 5 is a schematic view of a logical-to-physical mapping of a serial bidirectional multimedia link with which the system of FIG. 1 can be used.

FIG. 5 shows a schematic view of a logical-to-physical mapping of the serial bidirectional multimedia link. The logical representation provides several logical channels for each different kind of data. Video data, audio data and sideband data are transmitted via the bidirectional multimedia link, and, thus, a video data channel, an audio data channel and a sideband data channel are provided. The video data, audio data and sideband data are mapped to several unidirectional physical links as shown in FIG. 5. Although three physical links (LINK) through LINK2) are shown, it should be noted that any number of links, including a single link can be used depending on the application and bandwidth requirements.

The bandwidth and latency requirements of such a transmission system are asymmetrical. When high bandwidth is required to transport video data from a video source to a video data consumer, latency is extremely relaxed. Audio data has low bandwidth and relaxed latency requirements. Both audio and video data form a unidirectional communication path from a video or audio source to a video or audio data consumer, which is the downstream direction. In addition, generic sideband data is transmitted to enable control data transfer or to check or change the status of data transfer. This communication path typically is bidirectional in the downstream and upstream direction and has medium bandwidth requirements. But this communication path might require extremely low latency.

The bandwidth provided by physical links for data transfer must be used as efficiently as possible. The high bandwidth requirements of video data in the range of 2 Gbit/s does not allow line coding with many overheads because data rates above 1 Gbit/s per physical link place excessive burdens on the application design.

The key electrical property of the physical link is the capability of AC coupling. The envisaged applications connect different systems separated by up to 100 meters using an STP cable. To avoid DC currents within the cable, AC coupling is required. This requires the serial data to be DC balanced.

The only communication paths between the transmitter and the receiver are the serial links themselves, as additional signaling might not be available. The receiver must be able to synchronize to the incoming data stream without additional mechanism after reset, power-up or cable disconnects.

Figure 6:
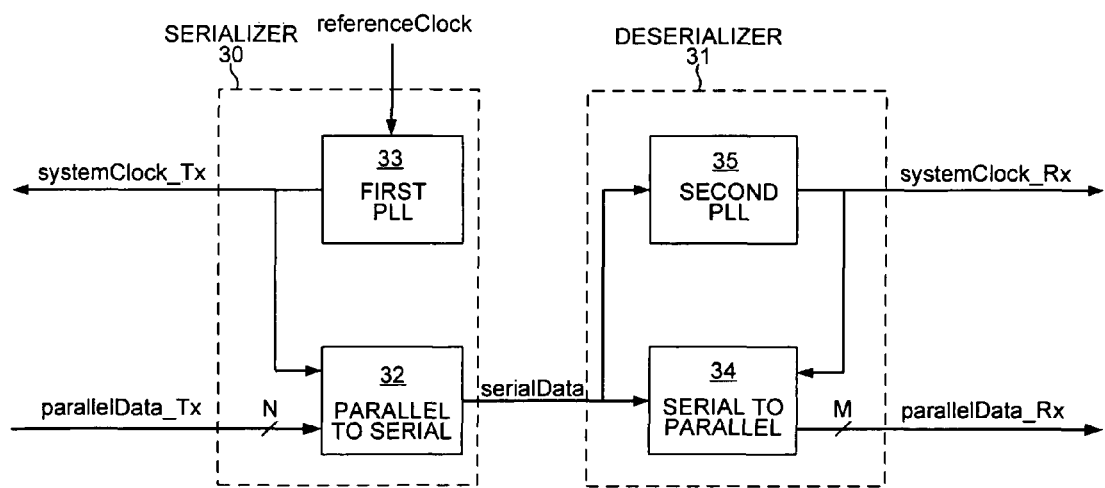
FIG. 6 is a schematic block diagram of a serializer/deserializer architecture of the bidirectional multimedia link of FIG. 5.

FIG. 6 is a block diagram of a serializer/deserializer architecture of the serial bidirectional multimedia link of FIG. 5. The embodiment of FIG. 6 includes a serializer 30 and a deserializer 31. Serializer 30 includes a parallel-to-serial converter 32 and a first phase-locked loop (PLL) 33. Deserializer 31 includes a serial-to-parallel converter 34 and a second PLL 35. First PLL 33 receives a reference clock referenceClock. First PLL 33 outputs a system clock systemClock_Tx, which is received by the parallel-to-serial converter 32. Both second PLL 35 and serial-to-parallel converter 34 of deserializer 31 are coupled to a serial data input lead of deserializer 31. Second PLL 35 and serial-to-parallel converter 34 receive a serialData signal from parallel-to-serial converter 32 of serializer 30. Second PLL 35 outputs an output system clock systemClock_Rx. A clock input lead of the serial-to-parallel converter 34 receives systemClock_Rx.

First PLL 33 multiplies the reference clock referenceClock to obtain a high frequency clock systemClock_Tx. A parallel data signal parallelData Tx is serialized with the high frequency clock systemClock_Tx. A serial data signal serialData triggers second PLL 35 to recover the high frequency clock in order to obtain systemClock_Rx, which is a recovered high frequency clock. The serial data signal serialData is converted to a parallel format with the recovered high frequency clock systemClock_Rx.

The clock system of serializer 30 based on the high frequency clock systemClock_Tx and the clock system of deserializer 31 based on the recovered high frequency clock systemClock_Rx are synchronous to each other. While deserializer 31 performs a so-called bit alignment, the parallel data at the output of deserializer 31 is not aligned.

Figure 7:
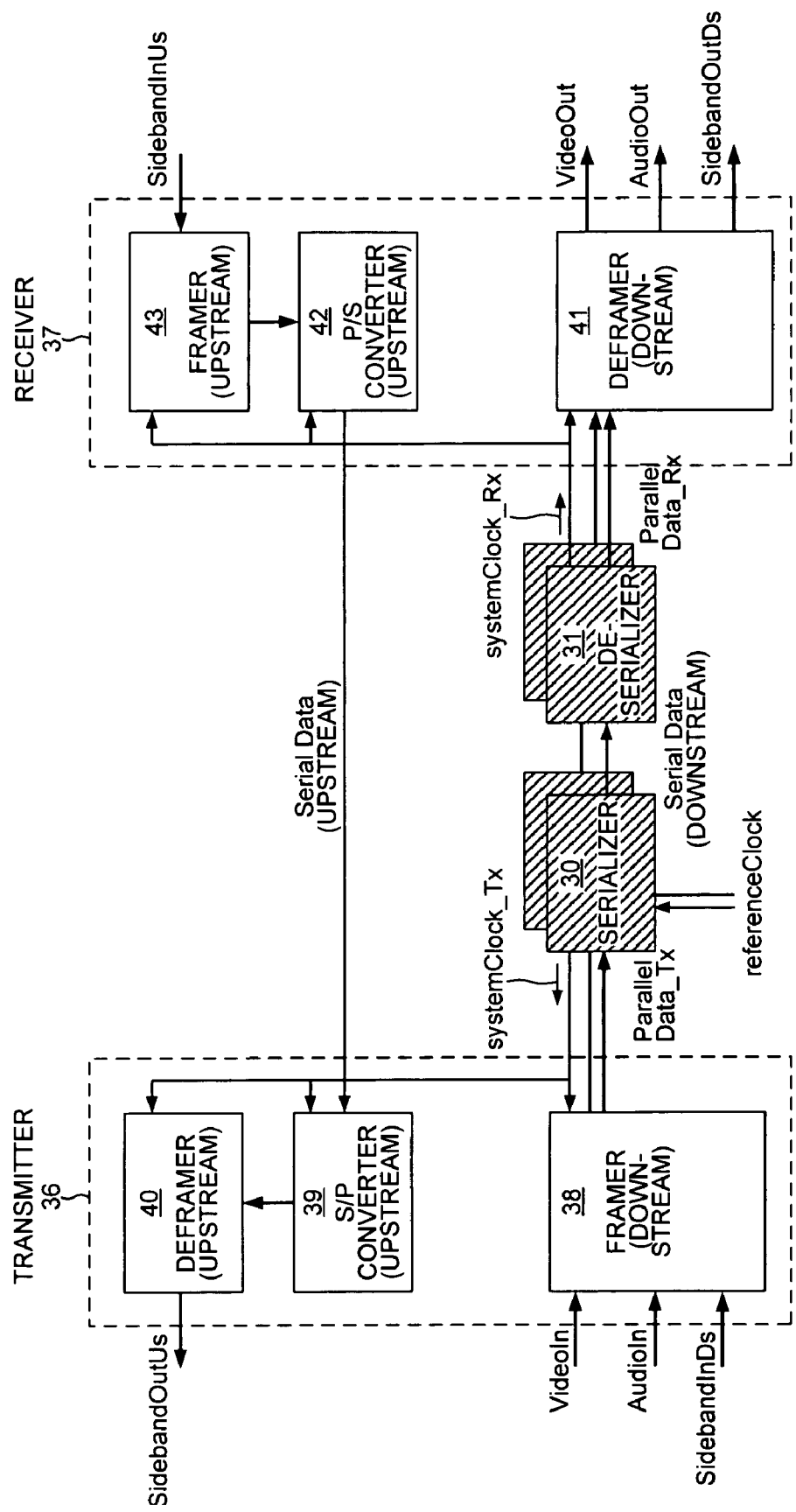
FIG. 7 is a more detailed schematic block diagram of the multimedia link architecture of FIG. 5.

FIG. 7 is a more detailed schematic block diagram of the multimedia link architecture. The multimedia link architecture comprises a transmitter 36 and a receiver 37. Transmitter 36 comprises a downstream framer 38, an upstream serial-to-parallel converter 39 and an upstream deframer 40. Receiver 37 comprises a downstream deframer 41, an upstream parallel-to-serial converter 42 and an upstream framer 43. Transmitter 36 and receiver 37 are coupled through an appropriate number of serializers 30 and deserializers 31, as shown in FIG. 6. The number of serializers 30 and deserializers 31, and therefore the number of downstream physical links, is set based on the required bandwidth of the multimedia link architecture. The higher the required bandwidth, the higher the number of downstream physical links.

Input video data VideoIn, input audio data AudioIn and downstream sideband data SidebandInDs are received by downstream framer 38. Downstream framer 38 outputs parallel data ParallelData_Tx, which is received by serializer 30. Serializer 30 outputs a clock signal systemClock_Tx, which is received on a clock input lead of transmitter 36. Serializer 30 and deserializer 31 are connected to each other via one or more downstream serial data lines. Serial data SerialData (downstream) passes from serializer 30 to deserializer 31. Deserializer 31 is connected to downstream deframer 41. Deframer 41 receives parallel data parallelData_Rx from deserializer 31. Deserializer 31 outputs a clock signal systemClock_Rx, which is received on a clock input lead of receiver 37. Downstream deframer 41 outputs video data VideoOut, audio data AudioOut and downstream sideband data SidebandOutDs.

Upstream framer 43 receives upstream sideband data SidebandInUs. The output of upstream framer 43 is received by upstream parallel-to-serial converter 42. Upstream parallel-to-serial converter 42 is connected via an upstream serial data line SerialData (upstream) to the upstream serial-to-parallel converter 39. Serial data passes from upstream parallel-to-serial converter 42 to upstream serial-to-parallel converter 39. The output of serial-to-parallel converter 39 is received by upstream deframer 40. Upstream deframer 40 outputs upstream sideband data SidebandOutUs.

A key property of the multimedia link architecture is the clock system. The multimedia link architecture features a synchronous clock system at transmitter 36 and receiver 37. Serializer 30 generates a high frequency system clock systemClock_Tx used by transmitter 36. Furthermore, serializer 30 shifts the serial data out with the high frequency system clock systemClock_Tx. Deserializer 31 recovers the high frequency system clock systemClock_Tx of transmitter 36 from the serial bit stream and provides to receiver 37 a recovered high frequency system clock systemClock_Rx, which is synchronous with the high frequency system clock systemClock_Tx.

The clock system enables a lossless serial data bit recovery in the downstream direction without the need of stuffing bits (no bandwidth overhead for bit recovery). In addition, in the upstream direction, no clock recovery is required, as all clocks are synchronous. Also, in the upstream direction, a lossless serial data bit recovery is enabled without the need of stuffing bits (no bandwidth overhead for bit recovery).

In the downstream direction, multimedia data such as video data, audio data, and sideband data are fed into downstream framer 38. Downstream framer 38 multiplexes this multimedia data into a specific frame structure, adds information to this frame structure for frame alignment, which is performed at receiver 37, and performs line coding of the frame structure, which ensures a DC balanced serial data stream. The parallel frame data is serialized at serializer 30, transmitted via a serial transmission media such as an STP cable or a fiber optic cable and finally again converted to a parallel data format at deserializer 31. Parallel data output from deserializer 31 is not aligned, as the deserialization process starts randomly on the serial data stream. Downstream deframer 41 performs the alignment of the parallel frame data by utilizing specific information of the frame structure and unpacks the multimedia data such as video data, audio data, and sideband data.

In the upstream direction, sideband data is fed into upstream framer 43. Upstream framer 43 multiplexes this data into a specific frame structure and converts this data into DC balanced symbols that are converted to a serial data stream by parallel-to-serial converter 42, transmitted via a serial transmission media such as an STP cable or a fiber optic cable and finally again converted to a parallel data format at serial-to-parallel converter 39. Due to the synchronous nature of the overall clock system, no clock recovery is required in the upstream direction. The serial data can be sampled with the local high frequency clock. Due to runtime effects over the serial data transmission path and due to unavoidable phase shifts between the several clocks, a phase alignment is performed within parallel-to-serial converter 42. The parallel data that is output by serial-to-parallel converter 39 is not aligned, as the serial-to-parallel conversion process starts randomly on the serial data stream. Upstream deframer 40 performs the alignment of the parallel frame data and decodes the DC balanced symbols to obtain the sideband data SidebandOutUs.

Figure 8:
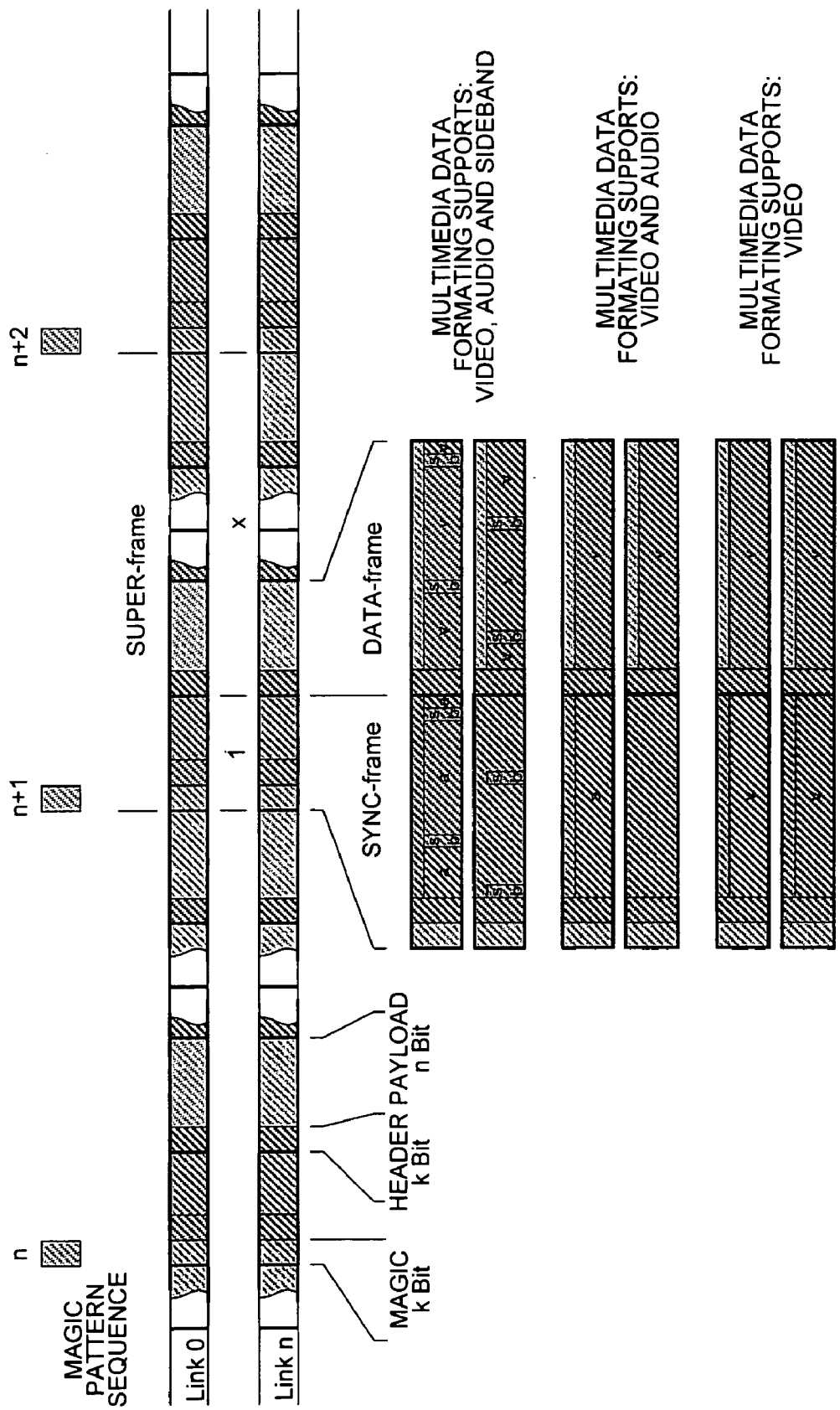
FIG. 8 is a schematic view of the downstream frame structure of data transmitted via the bidirectional multimedia link of FIG. 5.

FIG. 8 illustrates the downstream frame structure of data transmitted via the bidirectional multimedia link. Due to the high bandwidth requirements in the downstream direction, the downstream frame structure should provide the highest degree of efficiency. Therefore, the least amount of data should be added to enable frame data alignment, to perform line coding and to select between different formats of the multimedia data. The frame structure should provide for high bandwidth and high latency data paths, as well as for low or medium bandwidth and extremely low latency data paths.

To support a bandwidth above about 1 GBit/s, scalable link architecture is used to keep the bandwidth per link around 1 Gbit/s. The downstream frame structure shown in FIG. 8 provides for multiple serial links. The basic element is a SUPER-frame. The SUPER-frame comprises one synchronization frame (SYNC-frame) followed by a first predetermined number (x) of data frames (DATA-frame). The synchronization frame (SYNC-frame) comprises a second predetermined number (k) of bits of a first section (called the magic section) and the predetermined number (k) of bits of a second section (called the header section) followed by a third predetermined number (n) minus the second predetermined number of bits (i.e., n-k) of a payload section. The data frame (DATA-frame) comprises the second predetermined number (k) of bits of a third section (called the header section) followed by the third predetermined number (n) of bits of a payload section.

The first section (magic section) of a synchronization frame (SYNC-frame) comprises a known and unique sequence of bit patterns indicating a start of the synchronization frame SYNC-frame. The second section (header section) of the synchronization frame (SYNC-frame) comprises control information about line coding and about the format of multimedia data within the payload data. The line coding allows for a DC-balanced serial data stream. Therefore, the payload data is conditionally inverted to maintain an equal number of "1" and "0" bits within the serial data stream over a certain period of time.

The second predetermined number (k) of bits defines the second section (header section) and results in 2 k different binary patterns. A sub-set z of these 2 k patterns defines valid frame headers, since not all possible bit permutations of k bits mark valid control information. The remaining or a subset of 2 k-z bit patterns form a set of valid magic patterns MP1, . . . , Mpi. One of these magic patterns is chosen to have a special meaning and is called bogus magic pattern BMP. This bogus magic pattern BMP can never occur in the chosen line coding. A sequence over the valid magic patterns MP1, . . . , Mpi is defined.

To support different bandwidth allocation options for video data, audio data and sideband data, different payload formats exist, which are selected by control bits of the header section. To enable low latency and low jitter data paths for the sideband data, the payload bits that carry sideband data are equally spaced within the synchronization frame SYNC-frame and the data frame DATA-frame.

Figure 9:
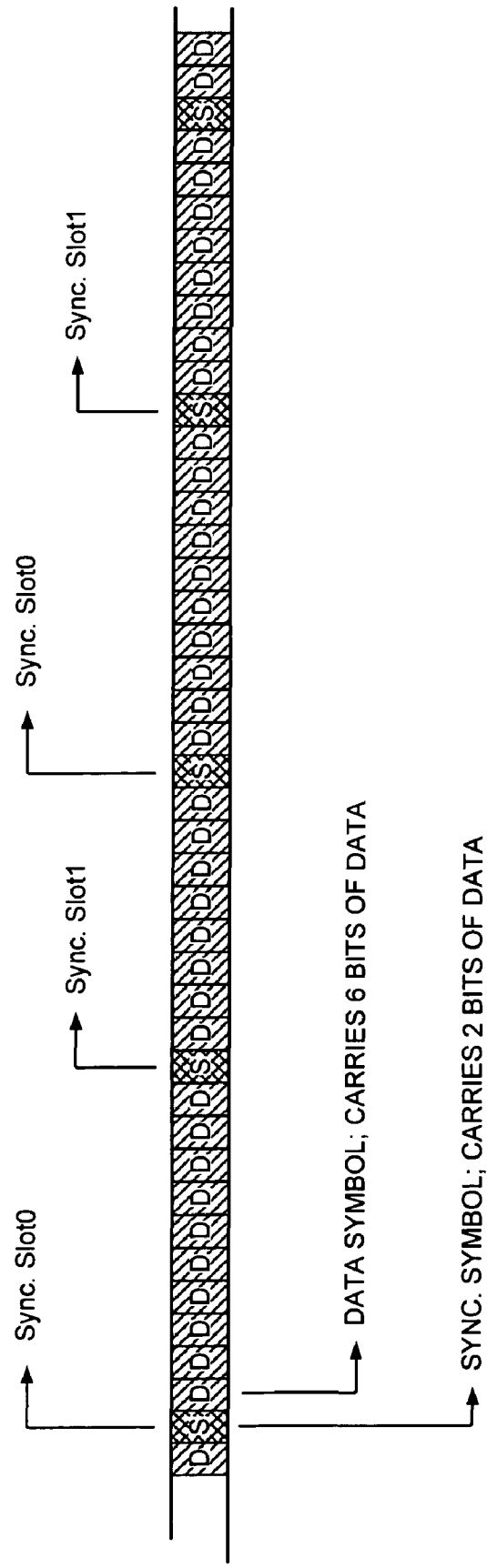
FIG. 9 is a schematic view of an upstream frame structure of data transmitted via the bidirectional multimedia link of FIG. 5.

FIG. 9 is a schematic view of an upstream frame structure of data transmitted via the bidirectional multimedia link. Due to the medium bandwidth requirements in the upstream direction, the upstream frame structure need not provide for the highest efficiency. The upstream frame structure can be based on the ease and safety of frame alignment considering the need of phase alignment of the serial data stream.

FIG. 9 shows that the upstream frame structure provides for one serial link. The basic frame structure comprises a data sequence beginning with the synchronization symbol S, followed by a fourth predetermined number (e.g., 10) of data symbols D, followed by another synchronization symbol S, followed by a fifth predetermined number (e.g., 8) of data symbols D, and so on. Each symbol comprises 8 bits. The symbols are obtained by a specific 6B/8B-coding scheme. The asymmetrical structure of the upstream frames allows differentiating between two synchronization symbols. Each synchronization symbol S provides for two low-bandwidth data paths. The data symbols D provide for medium bandwidth data paths.

The architecture of the bidirectional multimedia link is highly scalable. As shown by FIG. 8, high scalability is achieved by different compositions of multimedia data within one serial link. In addition, high scalability is also achieved by adapting the number of serial links used in a respective application.

The bidirectional multimedia link can implement transmissions across up to 100 meters using a STP cable. In addition, the bidirectional multimedia link is tolerant against bit errors due to the frame structure of the data, even though the data is not protected by a error protection protocol, such as CRC or parity. Finally, the bidirectional multimedia link allows for a simplified physical layer protocol to perform framing and alignment.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A system, comprising:
   an encoder that encodes a synchronization signal such that a control word is generated each time the synchronization signal changes, wherein the encoder outputs an encoder output that includes the control word each time the synchronization signal changes and includes no control word when the synchronization signal is not changing, and wherein the synchronization signal is used for horizontal synchronization and vertical synchronization;
   a multiplexer that receives payload data and the encoder output and that outputs a data stream by multiplexing the payload data and the encoder output, wherein the data stream comprises the payload data if no blanking period of the payload data is present, wherein the data stream comprises the encoder output if the blanking period of the payload data is present, and wherein if the blanking period of the payload data is present the data stream includes no control word when the synchronization signal is not changing;
   a data transmission system that transmits the data stream via a digital multimedia link;
   a demultiplexer that receives the data stream transmitted by the data transmission system, wherein the demultiplexer demultiplexes the payload data and the encoder output from the data stream such that the payload data and the control word are separated from each other; and
   a decoder that decodes the control word such that the synchronization signal is recovered.

2. The system of claim 1, wherein the data stream has a bandwidth, wherein the bandwidth of the data stream is reduced by multiplexing the payload data and the control word, and wherein none of the payload data is lost when the demultiplexer demultiplexes the payload data and the control word from the transmitted data stream.

3. The system of claim 1, wherein the data transmission system comprises a transmit FIFO memory and a receive FIFO memory, wherein the transmit FIFO memory receives the data stream before the data stream is transmitted, and wherein the receive FIFO memory receives the data stream before the data stream is demultiplexed.

4. The system of claim 1, wherein the payload data and the synchronization signal are provided synchronously to a system clock signal.

5. The system of claim 1, wherein the payload data is taken from the group consisting of pixel data and audio data.

6. The system of claim 1, wherein the encoder is a run-length encoder and the decoder is a run-length decoder.

7. The system of claim 1, wherein the data stream is transmitted across the digital multimedia link using the IEEE standard 1394.

8. The system of claim 1, wherein the synchronization signal is a pixel control signal used for vertical synchronization.

9. The system of claim 1, wherein the payload data contains no meaningful information when the blanking period of the payload data is present.

10. The system of claim 1, wherein the payload data conforms to a video format taken from the group consisting of: VGA, SVGA, XGA, SXGA and UXGA.

11. A method for lossless reduction of bandwidth of a data stream transmitted via a digital multimedia link, comprising:
    encoding a synchronization signal to generate an encoder output, wherein the encoder output includes a control word each time the synchronization signal changes and includes no control word when the synchronization signal is not changing, and wherein the synchronization signal is used for horizontal synchronization and vertical synchronization;
    multiplexing payload data and the encoder output to output a data stream, wherein the data stream comprises the payload data if no blanking period of the payload data is present, wherein the data stream comprises the encoder output if the blanking period of the payload data is present, and wherein if the blanking period of the payload data is present the data stream includes no control word when the synchronization signal is not changing;
    transmitting the data stream;
    demultiplexing the payload data and the control word from the transmitted data stream such that the payload data and the control word are separated from each other; and
    decoding the control word such that the synchronization signal is recovered, wherein the control word indicates a change of status of the synchronization signal, and wherein the encoding is performed such that an additional control word is generated each time the status of synchronization signal changes.

12. The method of claim 11, wherein the data stream is FIFO processed before being transmitted, and wherein the transmitted data stream is FIFO processed before being demultiplexed.

13. The method of claim 11, wherein the payload data and the synchronization signal are provided synchronously to a system clock of a payload data input interface.

14. The method of claim 11, wherein the payload data is taken from the group consisting of pixel data and audio data.

15. The method of claim 11, wherein the encoding is run-length encoding and the decoding is run-length decoding.

16. The method of claim 11, wherein the payload data conforms to a video format taken from the group consisting of: VGA, SVGA, XGA, SXGA and UXGA.

17. The method of claim 11, wherein the data stream has a bandwidth, wherein the multiplexing the payload data and the control word reduces the bandwidth of the data stream, and wherein none of the payload data is lost during the demultiplexing the payload data and the control word from the transmitted data stream.

* * * * *